US012747809B2

(12) United States Patent
Laursen

(10) Patent No.: US 12,747,809 B2
(45) Date of Patent: Sep. 29, 2026

(54) MULTI-TIRE AIR HOSE KIT

(71) Applicant: Tyler Laursen, Sacramento, CA (US)

(72) Inventor: Tyler Laursen, Sacramento, CA (US)

( * ) Notice: Subject to any disclaimer, the term of this patent is extended or adjusted under 35 U.S.C. 154(b) by 0 days.

(21) Appl. No.: 18/886,846

(22) Filed: Sep. 16, 2024

(65) Prior Publication Data

US 2026/0078848 A1 Mar. 19, 2026

(51) Int. Cl.

| | |
|---|---|
| ***F16L 11/12*** | (2006.01) |
| ***B60C 29/06*** | (2006.01) |
| ***B60S 5/04*** | (2006.01) |
| ***F16L 41/00*** | (2006.01) |
| ***F16L 41/02*** | (2006.01) |

(52) U.S. Cl.

CPC ............ *F16L 11/122* (2013.01); *B60C 29/06* (2013.01); *B60C 29/064* (2013.01); *B60S 5/043* (2013.01); *F16L 41/008* (2013.01); *F16L 41/021* (2013.01); *Y10T 137/3584* (2015.04); *Y10T 137/3662* (2015.04); *Y10T 137/86051* (2015.04); *Y10T 137/87877* (2015.04); *Y10T 137/87885* (2015.04)

(58) Field of Classification Search

CPC ....... Y10T 137/3662; Y10T 137/86051; Y10T 137/3584; Y10T 137/87877; Y10T 137/87885; B60S 5/043; F16L 11/122; F16L 41/008; F16L 41/021; B60C 29/064; B60C 29/06

USPC ................................ 137/227, 255–267, 883

See application file for complete search history.

(56) References Cited

U.S. PATENT DOCUMENTS 825,572 A * 7/1906 Baker ..................... B60C 23/10 141/38
938,522 A * 11/1909 Swain ................... F04B 43/009 137/227
1,385,080 A * 7/1921 Key ........................ F16L 37/40 285/8
2,579,048 A * 12/1951 Paul .................. B60C 23/00305 152/416
2,663,348 A * 12/1953 Farris .................... B60C 29/064 141/38
2,699,194 A * 1/1955 Iknayan .................... B60C 5/08 156/289
3,729,033 A * 4/1973 Bayerkohler ......... B60C 29/062 134/186

(Continued)

FOREIGN PATENT DOCUMENTS

AU 2020100651 A4 * 6/2020 ................ B60S 5/04

*Primary Examiner* — Matthew W Jellett

(74) *Attorney, Agent, or Firm* — Superior IP, PLLC; Dustin L. Call

(57) ABSTRACT

A hose kit. The hose kit includes a manifold. The manifold includes an air input, a first air output and a second air output. The hose kit also includes a first air output hose configured to attach to the first air output and a first tee fitting configured to attach to the first air output hose. The hose kit further includes a first tire whip configured to attach to the first tee fitting and a first tire hose configured to attach to the first tee fitting. The hose kit additionally includes a second air output hose configured to attach to the second air output and a second tee fitting configured to attach to the second air output hose. The hose kit moreover includes a second tire whip configured to attach to the second tee fitting and a second tire hose configured to attach to the second tee fitting.

20 Claims, 2 Drawing Sheets

(56) References Cited

U.S. PATENT DOCUMENTS 4,037,638 A * 7/1977 Mosca .................... B60C 23/10 141/38
4,387,931 A * 6/1983 Bland ............... B60C 23/00318 152/416
4,431,043 A * 2/1984 Goodell ............ B60C 23/00372 285/190
5,158,122 A * 10/1992 Moffett ................... B60S 5/043 137/227
5,180,456 A * 1/1993 Schultz ............. B60C 23/00372 152/416
5,287,906 A * 2/1994 Stech ................ B60C 23/00354 141/38
5,307,846 A * 5/1994 Heinemann ............. B60S 5/043 73/146
5,857,481 A * 1/1999 Zimmerman ........... B60S 5/043 137/227
5,884,659 A * 3/1999 Prosser ..................... B60S 5/04 157/1.1
6,244,316 B1 * 6/2001 Naedler ............ B60C 23/00345 152/417
6,557,404 B2 * 5/2003 Ziarati .................. B60C 29/064 73/146
6,742,995 B1 * 6/2004 Wood ...................... F04B 49/00 137/511
6,820,638 B1 * 11/2004 Gosinski ................. F16L 41/03 137/561 A
7,413,414 B2 * 8/2008 Wood ...................... F04B 41/02 417/234
7,530,379 B1 * 5/2009 Becker .............. B60C 23/00318 152/416
7,669,465 B2 * 3/2010 Becker .............. B60C 23/00318 152/417
8,245,746 B2 * 8/2012 Stanczak ................ F04B 41/02 152/417
8,794,258 B2 * 8/2014 Galasso .................... F17C 9/00 141/38
9,346,330 B2 * 5/2016 Musgrave ............... B60S 5/043
9,908,373 B2 * 3/2018 Hennig ............. B60C 23/00363
10,518,025 B2 * 12/2019 Fukuoka ............... A61M 39/28
11,136,007 B2 * 10/2021 Hibbard ............... G05D 16/208
11,161,482 B1 * 11/2021 Klingerman ............ B60S 5/046
11,685,201 B2 * 6/2023 Musgrave ............. B60C 23/009 152/427
11,945,417 B1 * 4/2024 Kledzik .................. F16L 47/32
2012/0007730 A1 * 1/2012 Vecht-Lifshitz ........ B60S 5/046 340/442
2018/0319231 A1 * 11/2018 Zimmerman ......... B60C 29/064
2025/0367989 A1 * 12/2025 Laursen ................ B60C 29/064

* cited by examiner

MULTI-TIRE AIR HOSE KIT

CROSS-REFERENCE TO RELATED APPLICATIONS

Not applicable.

BACKGROUND OF THE INVENTION

There are a number of circumstances where it is necessary to deflate (and subsequently inflate) all of the tires of a vehicle. For example, before driving on sand, drivers of four-wheel vehicles deflate their vehicle's tires so that they make a wider and longer surface across the top of the sand, rather than digging holes and potentially bogging down. This allows the vehicle to continue moving forward relatively easily without wheel spin and gives a much softer ride over holes. Similarly, on rocky roads that are loose with sharp rocks, deflating tires can allow them to conform to rocks that might otherwise pierce the tire.

Conventional techniques for deflating tires usually involve the driver getting down on their knees to manually press the pin of the valve of each tire. This means that the driver needs to get down on their knees four times, which can be hard work, especially for older drivers. It can also be difficult to deflate all the vehicle's tires to the same pressure which, if not done correctly, can adversely affect the driving performance of the vehicle and increase wear.

A similar procedure needs to be repeated upon the vehicle returning to paved roads, with the driver having to go to each tire, fit the outlet of an air compressor to the tire's valve and inflate the tire. Again, this is a time consuming and relatively strenuous activity, and inconsistencies in the pressures to which each tire is inflated can easily occur at this time. As noted above, tires having different pressures can adversely affect the driving performance of the vehicle and increase wear, and even more so as the vehicle is likely to be driven faster and for longer in this condition.

Many conventional air hose kits simply insert an air chuck within a line, allowing the air hose to be attached to two tires. However, this leads to a number of problems. In particular, off-roading wheels often are designed to protect the air stem of a tire. This means that the air chuck cannot actually attach to the tire stem.

Accordingly, there is a need in the art for a device that can simplify the procedure for deflating and inflating all a vehicle's tires. In particular, there is a need in the art for a device that allows a user to deflate all tires of a vehicle simultaneously and evenly while identifying the pressure for the user. Likewise, there is a need in the art for a device that can inflate all tires of a vehicle simultaneously and evenly while identifying the pressure for the user.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a hose kit configured to change the tire pressure of multiple tires simultaneously. The hose kit includes a manifold. The manifold includes an air input, a first air output and a second air output. The hose kit also includes a first air output hose configured to attach to the first air output and a first tee fitting configured to attach to the first air output hose. The hose kit further includes a first tire whip configured to attach to the first tee fitting and a first tire hose configured to attach to the first tee fitting. The hose kit additionally includes a second air output hose configured to attach to the second air output and a second tee fitting configured to attach to the second air output hose. The hose kit moreover includes a second tire whip configured to attach to the second tee fitting and a second tire hose configured to attach to the second tee fitting.

Another example embodiment includes a hose kit configured to change the tire pressure of multiple tires simultaneously. The hose kit includes a manifold. The manifold includes an air input, a first air output, and a second air output. The hose kit also includes a first air output hose configured to attach to the first air output and a first tee fitting configured to attach to the first air output hose. The hose kit further includes a first tire whip configured to attach to the first tee fitting and a second air output hose configured to attach to the first tee fitting. The hose kit additionally includes a second tee fitting configured to attach to the second air output hose, a first tire hose configured to attach to the second tee fitting and a second tire whip configured to attach to the second tee fitting. The hose kit moreover includes a third air output hose configured to attach to the second air output and a third tee fitting configured to attach to the third air output hose. The hose kit also includes a third tire whip configured to attach to the third tee fitting and a fourth air output hose configured to attach to the third tee fitting. The hose hit also includes a fourth tee fitting configured to attach to the fourth air output hose, a second tire hose configured to attach to the fourth tee fitting, and a fourth tire whip configured to attach to the fourth tee fitting.

Another example embodiment includes a hose kit configured to change the tire pressure of multiple tires simultaneously. The hose kit includes a manifold. The manifold includes an air input, a first air output, and a second air output. The hose kit also includes a first air output hose configured to attach to the first air output and a first tee fitting configured to attach to the first air output hose. The hose kit further includes a first tire whip configured to attach to the first tee fitting and a first locking air chuck configured to attach to the first tire whip. The hose kit additionally includes a first tire hose configured to attach to the first tee fitting and a second locking air chuck configured to attach to the first tire hose. The hose kit moreover includes a second air output hose configured to attach to the second air output and a second tee fitting configured to attach to the second air output hose. The hose kit also includes a second tire whip configured to attach to the second tee fitting and a third locking air chuck configured to attach to the second tire whip. The hose kit further includes a second tire hose configured to attach to the second tee fitting and a fourth locking air chuck configured to attach to the second tire whip.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
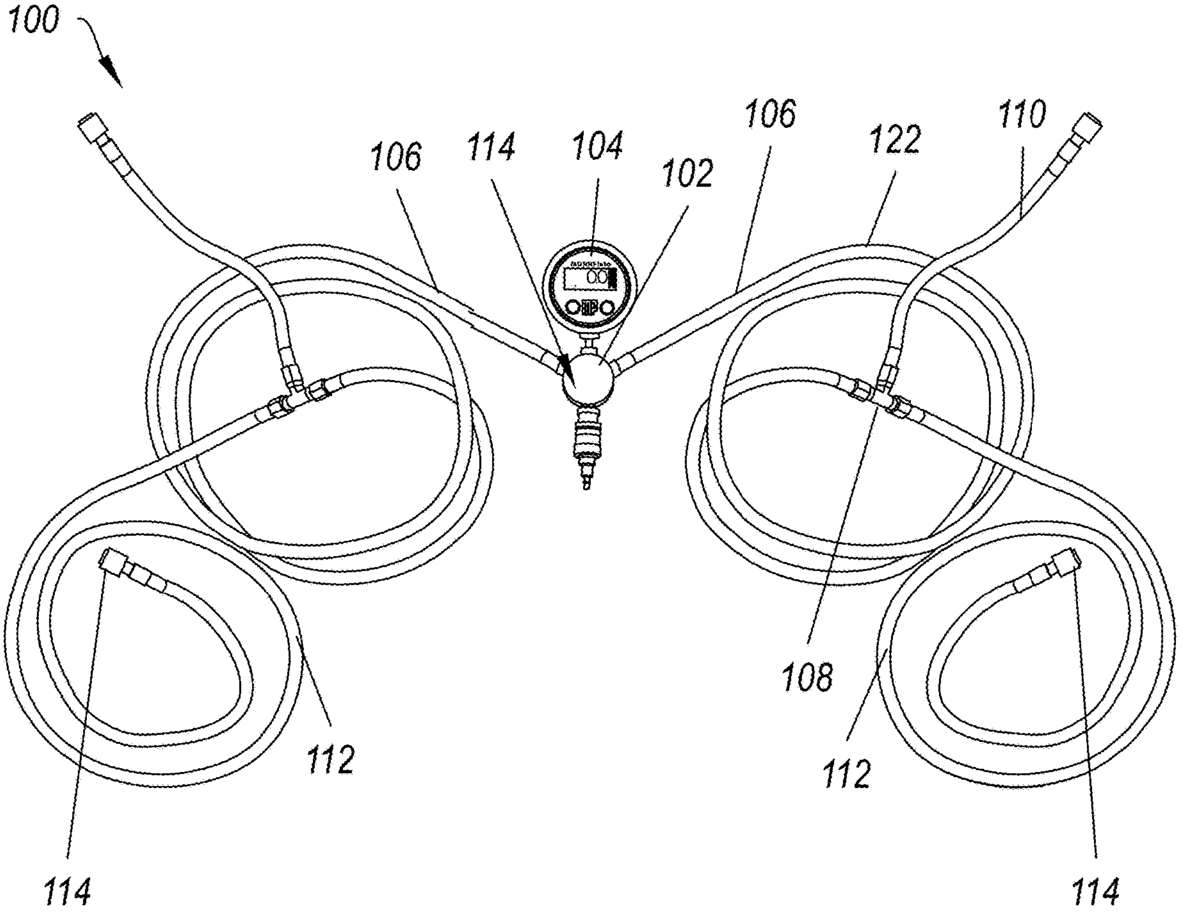
FIG. 1 illustrates an example of a hose kit.

FIG. 1 illustrates an example of a hose kit 100. The hose kit 100 can allow a user to simultaneously change the tire pressure of multiple tires. I.e., the hose kit 100 can allow a user to inflate or deflate more than one tire at the same time. In particular, inflating or deflating multiple tires simultaneously is not simply a matter of hooking an air hose to each tire. Doing so leads to a number of problems which will be discussed herein.

FIG. 1 shows that the hose kit 100 can include a manifold 102. The manifold 102 distributes air in multiple directions. For example, the manifold 102 can receive compressed air and split the air flow into two or more outputs. I.e., the manifold 102 connect a single input with multiple outputs. Likewise, the manifold 102 can take multiple air flows and combine them into a single air flow, which is being used in a deflation operation. I.e., the manifold 102 can connect multiple outputs with a single input. One of skill in the art will appreciate that the terms "input" and "output" are not necessarily defined by air flow. For example, if the air compressor is being used to deflate tires, then airflow is from multiple outputs in the manifold 102 to a single input of the manifold 102. During an inflation operation, the air flow is from the single input of the manifold 102 to the multiple outputs of the manifold 102.

FIG. 1 also shows that the hose kit 100 can include a gauge 104. For example, the gauge 104 can be attached to the hose kit 100 at the manifold 102. I.e., the gauge 104 can show a measurement of air pressure at the manifold 102, which equates to the air pressure at all points in the hose kit 100 (if all connection points along the hose kit 100 are open). The gauge 104 allows the user to determine the current pressure in the multi-tire inflation/deflation system 100 and by extension any connected tires. This allows the user to determine the current state of all tires simultaneously. The gauge 104 can be an analog or digital gauge. The gauge 104 is not as accurate when the air compressor 102 is actively moving air, because air currents cause noise in the gauge. However, it can be used to approximate the pressure and will be accurate when the air compressor 102 is not actively moving air.

FIG. 1 further shows that the hose kit 100 can include one or more output air hoses 106. The output air hoses 106 are configured to attach to the manifold 102. This allows a user to equalize air pressure in multiple connected tires. I.e., the output air hoses 106 create an indirect physical connection between the manifold 102 and the connected tires. The output air hoses 106 can be attached to the manifold directly or via a releasable connection, such as an air chuck. As used in the specification and the claims, the phrase "configured to" denotes an actual state of configuration that fundamentally ties recited elements to the physical characteristics of the recited structure. That is, the phrase "configured to" denotes that the element is structurally capable of performing the cited element but need not necessarily be doing so at any given time. Thus, the phrase "configured to" reaches well beyond merely describing functional language or intended use since the phrase actively recites an actual state of configuration.

FIG. 1 additionally shows that the hose kit 100 can include tee fittings 108. The tee fittings 106 are connected to each of the output air hoses 106. The tee fittings 106 allow one input air hose 122 to be connected to multiple output air hoses 106. I.e., the tee fittings 108 connect three connected air hoses, one of which will be the output air hose 106. One of skill in the art will appreciate during active air movement that the tee fittings 108 reduces the amount of air flow in the output hoses (since the output hoses have a bigger combined cross-sectional area than the input cross-sectional area) but without active air flow, pressure will equalize. Therefore, if an air compressor is connected it needs to be capable of creating enough flow to inflate all connected tires via all connected output air hoses 106.

FIG. 1 moreover shows that the hose kit 100 can include a tire whip 110. The tire whip 110 can be connected to a nearby tire. I.e., the tire whip 110 is intended to convey air between a tire and a tee fitting 108. Tire whips 110 provide a number of benefits relative to attaching an air chuck directly to the tee fitting 108. First, the tire whip 110 gives flexibility to connect to tires. Second, for some tires the air stem is not on the exterior of the tire or is otherwise protected and a tire whip 110 allows for a connection to these tires. I.e., the tire whip 110 makes connection to a tire easier in situations where there is not a "straight shot" to an air stem. Finally, some air stems point toward the center of the tire. This is reachable with a tire whip 110 but not with an air chuck attached to a tee fitting 108.

FIG. 1 also shows that the hose kit 100 can include a tire hose 112. The tire hose 112 allows for connection to one or more additional tires after splitting of the air flow by tee fitting 108. I.e., the tire hose 112 is similar to a tire whip 110 in that it is a hose connected to a tee fitting 108 which can connect to a tire.

One of skill in the art will appreciate that instead a second output air hose 106 can be connected to the tee fitting 108. This allows a user to connect multiple tires. For example, if the user needs to connect to a vehicle with six tires, then one output air hose 106 is connected on one end to a manifold 102 and a tee fitting 108 on the other end. The tee fitting 108 can be connected to a tire whip 110 and a second output air hose 106, which is connected to a second tee fitting 108. The second tee fitting 108 has a second tire whip 110 connected and a tire hose 112. The two tire whips 110 and the tire hose 112 are each connected to one tire. The layout is similar on the other side of the manifold 102.

FIG. 1 further shows that the hose kit 100 can include a locking air chuck 114. The locking air chuck 114 attaches to the stem valve of a tire and then locks into place. The locking air chuck 114 is placed as far as possible on the stem valve of a tire with collar 128 pulled all the way back. The user then slides the collar 128 forward while holding pressure on the valve stem. Unless placed on a stem valve, the locking air chuck 114 defaults to a closed position to prevent air leakage. Thus, if three locking air chucks 114 are placed on tires and a fourth locking air chuck 114 is left free, air will only flow through the three output air hoses 106 which are connected to tires via a locking air chuck 114. An example of a locking air chuck is disclosed in Ser. No. 18/886,838 filed on Sep. 16, 2024 and entitled "LOCKING AIR CHUCK" which application is incorporated herein by reference in its entirety.

Figure 2:
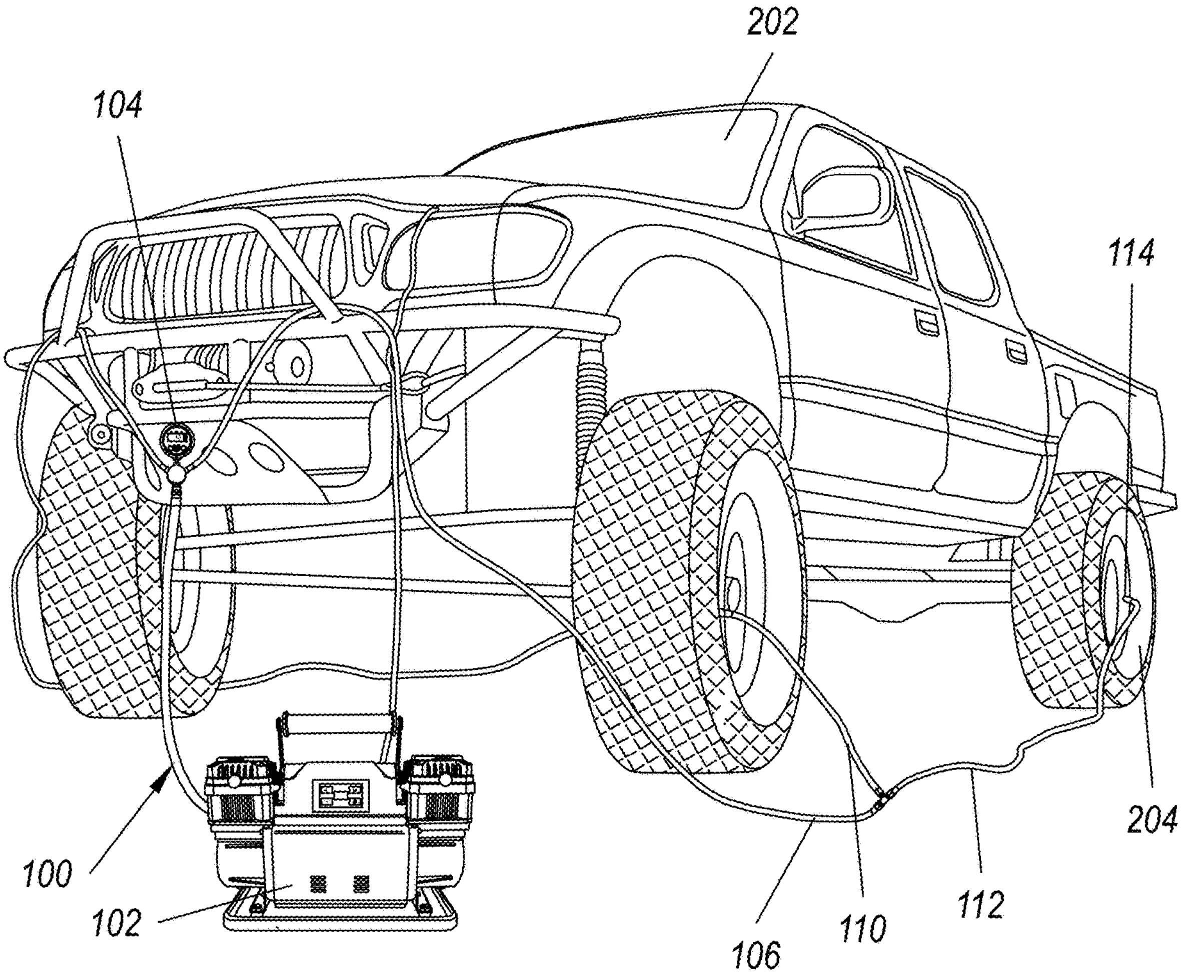
FIG. 2 illustrates an example of a hose kit attached to a vehicle.

FIG. 2 illustrates an example of a hose kit 100 attached to a vehicle 202. The vehicle 202 has four tires 204 but can include any number of tires and the hose kit 100 can be used to inflate a single tire if needed (although this is not optimal). The tires 204 of the vehicle become equalized with the same pressure when all attached via the hose kit 100.

When first placed on the tires 204 the hose kit 100 equalizes all pressures within the tires 204, since the output air hoses 106 have an open connection to all tires 204 via the locking air chucks 114. I.e., all tires 204, tire whips 110 and tire hose 112 become a single system with equal pressure throughout. The pressure can be determined by the user via gauge 104. The user can then add air or remove air depending on what is needed to achieve the desired final pressure.

The materials and dimensions of the air hoses are critical for correct operation (as used herein "air hoses" includes any hose, including output air hoses 106, tire whips 110, and tire hoses 112). Air hoses must be long enough to reach the tires but short enough that they don't make it difficult to maintain a desired pressure. Problems discovered during creation and use of the air hoses in off roading conditions include: 1) the hoses are exposed to UV from sunlight, causing some materials to crack; 2) hoses can have "memory" and when wound for long periods of time can be difficult to return to a straight configuration; and 3) during cold conditions (either during use or during storage) can crack or break. To solve these problems, the air hoses are made of 3-layer rubberized polyvinyl chloride ("PVC") material. Rubberized PVC is freeze resistant, does not hold memory, so it lays flat for each use, and is UV resistant, which prevents breakdown when left in sunlight.

In addition, air hoses with small diameters were found to create too much resistance to air flow, causing air compressors to burn out and air hoses with large diameters were found to require too much power to create the desired air pressures. Likewise, the thickness of the air hose wall is critical for operation. If the walls are too thick, the hoses becomes heavy and unwieldy but if the walls are too thin the hoses will burst when pressurized. Based on these facts, it was discovered that the optimal outer diameter of the air hoses should be between 9 mm and 15 mm and that the inner diameter of the air hoses should be between 5 mm and 6.6 mm, which allows enough air flow but prevents the air hoses from becoming overly bulky, preventing use by a user. In particular, the air hoses should have an outer diameter of approximately 12 mm and the inner diameter should have an inner diameter of 5.8 mm. As used in the specification and the claims, the term approximately shall mean that the value is within 10% of the stated value, unless otherwise specified.

Finally, the length of the air hoses is critical for proper operation. In particular, tire whips 110 which are too short can end up with air hoses hanging from the tire air stems, which can cause the air chuck to pop off the tire and cause wear on the tire whips 110. Likewise, when tire whips 110 are too long they have been found to create too much bulk and reduce effectiveness. Therefore, it has been found that the tire whips 110 should be between 25 and 35 inches in length. Preferably, the tire whips should be approximately 30 inches in length.

In addition, the length of the output air hoses 106 and tire hoses 112 aid users depending on vehicle size. One of skill in the art will appreciate that the length of the output air hoses 106 depends largely on the width of the vehicle for which use is intended whereas the length of the tire hoses 112 depends mainly on the length of the vehicle for which use is intended. For example, for a "compact" size the output air hoses 106 can be approximately 100 inches long with the tire hoses 112 approximately 100 inches long. For a "regular" size the output air hoses 106 can be approximately 130 inches long with the tire hoses 112 approximately 130 inches long. For a "large" size the output air hoses 106 can be approximately 130 inches long with the tire hoses 112 approximately 160 inches long. For an "extra large" size the output air hoses 106 can be approximately 130 inches long with the tire hoses 112 approximately 200 inches long.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A hose kit configured to change a tire pressure of multiple tires simultaneously, the hose kit comprising:
- a manifold, wherein the manifold includes:
  - an air input configured to attach to an external air source;
  - a first air output; and
  - a second air output;
- an input air chuck, the input air chuck attached to the air input;
- a first air output hose;
- a first air chuck, the first air chuck configured to releasably attach the first air output to the first air output hose;
- a first tee fitting configured to attach to the first air output hose;
- a first tire whip configured to attach to the first tee fitting;
- a first tire hose configured to attach to the first tee fitting;
- a second air output hose;
- a second air chuck, the second air chuck configured to releasably attach the second air output to the second air output hose;
- a second tee fitting configured to attach to the second air output hose;
- a second tire whip configured to attach to the second tee fitting; and
- a second tire hose configured to attach to the second tee fitting.

2. The hose kit of claim 1 further comprising an air pressure gauge attached to the manifold.

3. The hose kit of claim 1 wherein:
- the air input is configured to:
  - prevent air flow when the air input is not attached to the external air source; and
  - allow air flow when the air input is attached to the external air source;
- the first air chuck is configured to:
  - allow air flow when the first air output hose is connected to the first air output; and
  - prevent air flow when the first air output hose is not connected to the first air output; and
- the second air chuck is configured to:
  - allow air flow when the second air output hose is connected to the second air output; and
  - prevent air flow when the second air output hose is not connected to the second air output.

4. The hose kit of claim 1 further comprising a third air chuck on the first tire whip wherein the third air chuck is configured to:

allow the first tire whip to connect to a first tire stem;

prevent air flow when not attached to the first tire stem; and allow air flow when attached to the first tire stem.

5. The hose kit of claim 4 further comprising a fourth air chuck on the second tire whip wherein the fourth air chuck is configured to:

allow the second tire whip to connect to a second tire stem;

prevent air flow when not attached to the second tire stem; and allow air flow when attached to the second tire stem.

6. The hose kit of claim 5 further comprising a fifth air chuck on the first tire hose wherein the fifth air chuck is configured to:

allow the first tire hose to connect to a third tire stem;

prevent air flow when not attached to the third tire stem; and allow air flow when attached to the third tire stem.

7. The hose kit of claim 6 further comprising a sixth air chuck on the second tire hose wherein the sixth air chuck is configured to:

allow the second tire hose to connect to a fourth tire stem;

prevent air flow when not attached to the fourth tire stem; and allow air flow when attached to the fourth tire stem.

8. A hose kit configured to change a tire pressure of multiple tires simultaneously, the hose kit comprising:

a manifold, wherein the manifold includes:

an air input configured to attach to an external air source;

a first air output; and a second air output;

a first air output hose;

a first air chuck, the first air chuck configured to releasably attach the first air output and the first air output hose;

a first tee fitting configured to attach to the first air output hose;

a first tire whip configured to attach to the first tee fitting;

a second air output hose configured to attach to the first tee fitting;

a second tee fitting configured to attach to the second air output hose;

a first tire hose configured to attach to the second tee fitting;

a second tire whip configured to attach to the second tee fitting;

a third air output hose;

a second air chuck, the second air chuck configured to releasably attach the second air output and the third air output hose;

a third tee fitting configured to attach to the third air output hose;

a third tire whip configured to attach to the third tee fitting;

a fourth air output hose configured to attach to the third tee fitting;

a fourth tee fitting configured to attach to the fourth air output hose;

a second tire hose configured to attach to the fourth tee fitting; and a fourth tire whip configured to attach to the fourth tee fitting.

9. The hose kit of claim 8, wherein each of the first air hose and second air hose includes 3-layer rubberized polyvinyl chloride.

10. The hose kit of claim 1, further comprising:

a first locking air chuck attached to the first tire whip, wherein the first locking air chuck:

prevents air flow when not attached to a first tire stem;

allows air flow when attached to the first tire stem; and locks into place when attached to the first tire stem;

a second locking air chuck attached to the first tire hose, wherein the second locking air chuck:

prevents air flow when not attached to a second tire stem;

allows air flow when attached to the second tire stem; and locks into place when attached to the second tire stem;

a third locking air chuck attached to the second tire whip, wherein the third locking air chuck:

prevents air flow when not attached to a third tire stem;

allows air flow when attached to the third tire stem; and locks into place when attached to the third tire stem; and a fourth locking air chuck attached to the second tire hose, wherein the fourth locking air chuck:

prevents air flow when not attached to a fourth tire stem;

allows air flow when attached to the fourth tire stem; and locks into place when attached to the fourth tire stem.

11. The hose kit of claim 10, wherein an outer diameter of each of the first air output hose and the second air output hose is between 8 mm and 15 mm.

12. The hose kit of claim 10, wherein the outer diameter of each of the first air output hose and the second air output hose is approximately 12 mm.

13. The hose kit of claim 10, wherein an inner diameter of each of the first air output hose and the second air output hose is between 5 mm and 6.6 mm.

14. The hose kit of claim 10, wherein the inner diameter of each of the first air output hose and the second air output hose is approximately 5.8 mm.

15. The hose kit of claim 10, wherein a length of each of the first tire whip and the second tire whip is between 25 inches and 35 inches.

16. The hose kit of claim 10, wherein the length of each of the first tire whip and the second tire whip is approximately 30 inches.

17. The hose kit of claim 10, wherein:

a length of the first air output hose is approximately 100 inches;

a length of the second air output hose is approximately 100 inches;

a length of the first tire hose is approximately 100 inches; and a length of the second tire hose is approximately 100 inches.

18. The hose kit of claim 10, wherein:

a length of the first air output hose is approximately 130 inches;

a length of the second air output hose is approximately 130 inches;

a length of the first tire hose is approximately 130 inches; and a length of the second tire hose is approximately 130 inches.

19. The hose kit of claim 10, wherein:

a length of the first air output hose is approximately 130 inches;

a length of the second air output hose is approximately 130 inches;

a length of the first tire hose is approximately 160 inches; and a length of the second tire hose is approximately 160 inches.

20. The hose kit of claim 10, wherein:

a length of the first air output hose is approximately 130 inches;

a length of the second air output hose is approximately 130 inches;

a length of the first tire hose is approximately 200 inches; and a length of the second tire hose is approximately 200 inches.

* * * * *